(12) United States Patent
Malzbender

(10) Patent No.: US 6,741,251 B2
(45) Date of Patent: May 25, 2004

(54) METHOD AND APPARATUS FOR VARYING FOCUS IN A SCENE

(75) Inventor: Thomas Malzbender, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 323 days.

(21) Appl. No.: 09/932,691

(22) Filed: Aug. 16, 2001

(65) Prior Publication Data

US 2003/0034977 A1 Feb. 20, 2003

(51) Int. Cl.$^7$ .................................. G06T 5/00
(52) U.S. Cl. ................ 345/428; 345/426; 345/582; 345/589
(58) Field of Search ................ 345/426, 428, 345/582, 589; 382/254, 255, 302; 250/234

(56) References Cited

U.S. PATENT DOCUMENTS 6,130,967 A * 10/2000 Lee et al. .................. 382/302
6,248,995 B1 * 6/2001 Tanaami et al. ........... 250/234

FOREIGN PATENT DOCUMENTS

WO    WO94/10653    5/1994
WO    WO97/25690    7/1997

OTHER PUBLICATIONS

Debevec, "Rendering Synthetic Objects into Real Scenes: Bridging Traditional and Image–Based Graphics with Global Illumination and High Dynamic Range Photography", ACM SIGGRAPH 1998, pp. 1–10.*

Debevec et al., "Recovering High Dynamic Range Radiance Maps from Photographs", ACM SIGGRAPH 1997.*

Sakas et al., "Case Study: Visualization of Laser Confocal Microscopy Datasets", IEEE, 1996, pp. 375–379.*

Senft, "Volume Microscopy of Biological Specimens Based on Non–Confocal Imaging Techniques", IEEE, 1990, pp 424–428.*

Tom Malzbender et al —Polynomial Texture Maps —ACM SIGGRAPH 2001 —Aug. 12–17, 2001 —Los Angeles CA pp. 519–527.

Kazuya Kodama et al —Acquisition of an All–Focused Image by the Use of Multiple Differently Focused Images —Systems and Computers of Japan Vol 29 No 1 1998 —pp. 1–11.

* cited by examiner

Primary Examiner—Almis R. Jankus

(57) ABSTRACT

A method of varying focus in a scene. Specifically, one embodiment of the present invention discloses a method for modeling a scene using a parametric texture map (PTM) under varying focus conditions of one or more dimensions: e.g., focus depth and depth of field. A dataset of photographs is obtained under separate focus conditions. Approximation of the dataset creates an associated PTM representation that is capable of generating scenes of the photographic scene under varying focus conditions anywhere within the range of focus conditions specified by the initial data set. In addition, extrapolation yields results outside the range of focus conditions.

46 Claims, 11 Drawing Sheets

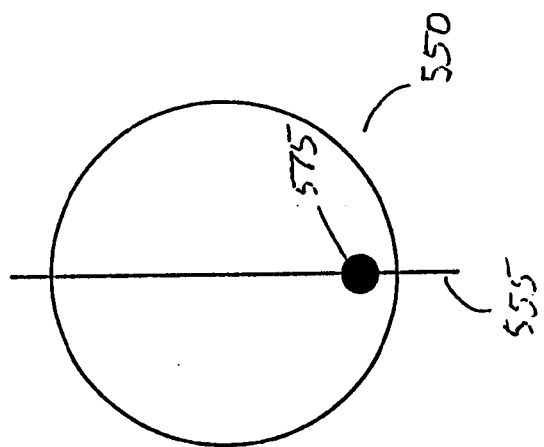
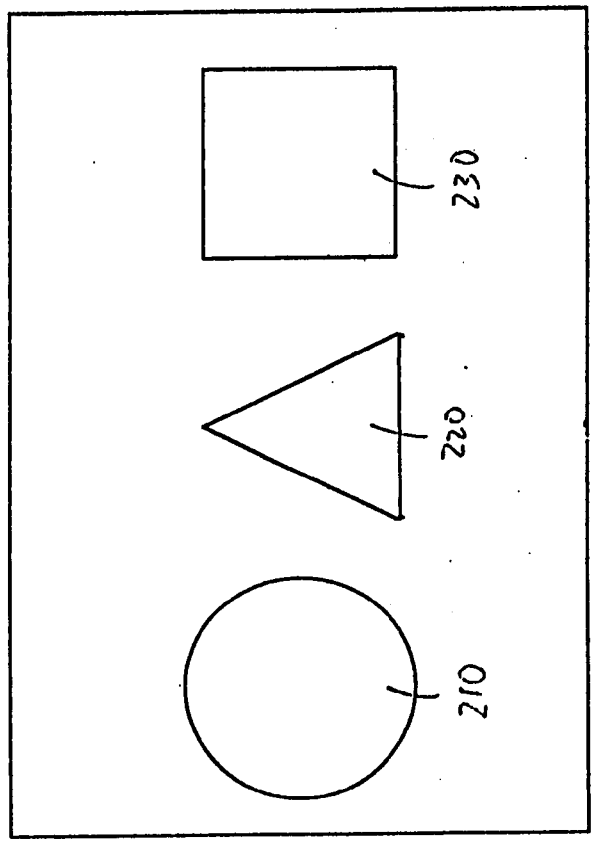
Fig. 5B

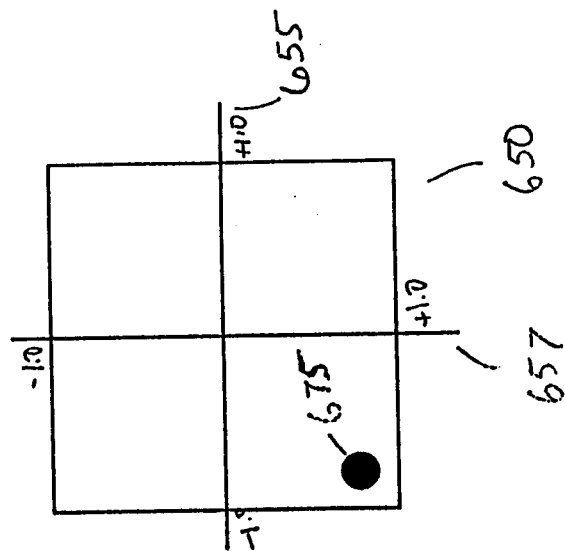
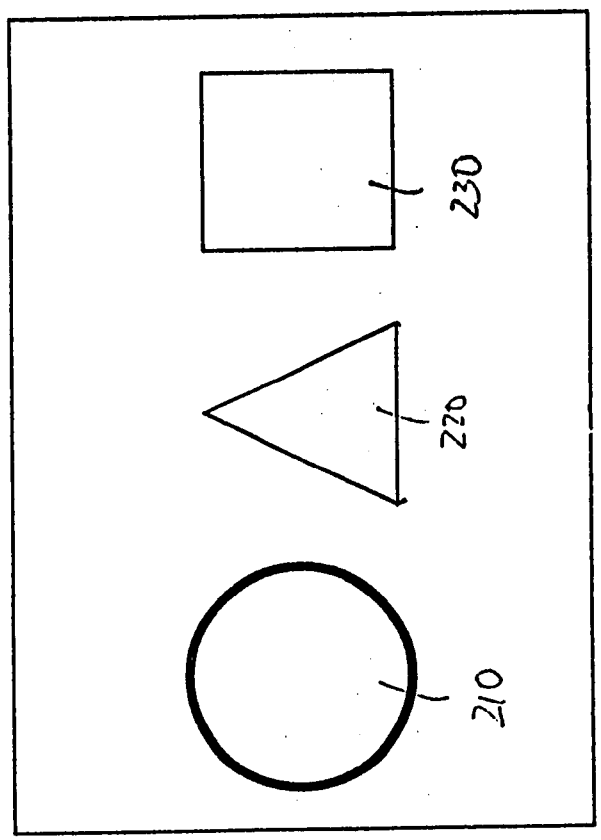
Fig. 6

METHOD AND APPARATUS FOR VARYING FOCUS IN A SCENE

BACKGROUND OF THE INVENTION

1. Field of the Invention

The present invention relates to the field of computer graphics systems. More specifically, the present invention relates to the use of parametric texture maps to model a scene under varying focus conditions

2. Related Art

Photographs provide a two-dimensional representation of a three dimensional scene as captured by an imaging device, such as a camera. A skilled photographer can manipulate the imaging device by varying focus parameters to produce different photographs of the same scene. Since there is no single representation of a scene, the art of photography involves knowing how to manipulate an imaging device to create the desired photographic representation.

Although the term "photograph" is used throughout this disclosure, the term, photograph, is not limited to conventional film based or digital means, but is directed towards all means of capturing images.

Heretofore, once a photograph was created, pre-production parameters used to create the photograph could not be changed. For example, focus conditions in one or more dimensions were pre-designated in the imaging device at the time of exposure in order to create the photograph. These various dimensions include focus conditions that vary in focus depth, depth of field, etc.

Unfortunately, the photograph in the prior art was dictated by the focus conditions set by the imaging device. Thus, the focus condition of the photograph was fixed and determined at the time of exposure. Once fixed, after the exposure, the photographer had no control over the focus conditions in the post production process.

For example, in an advertising campaign, a photoshoot of a static three-dimensional scene having distinct foreground and background areas is conducted. The photographer may take numerous photos at varying focus conditions in two dimensions: focal depth and depth of field. Thereafter, the photographer produces a photo-layout of the scene with photographs of varying focus conditions. Depending on the skill of the photographer, it is hoped that at least one of the photographs in the photo-layout can be used in the advertising campaign.

During the photoshoot, the photographer is limited by time, expense, and practicality. In other words, the photographer cannot take photographs over the full range of focus conditions. This is where the photographer's skill and knowledge in the art of photography are utilized. Through experience, the photographer selects the focus conditions necessary to produce a particular photograph for the photo-layout and ultimately for the advertising campaign.

However, for each of the photographs created, the focus conditions are unchangeable. Should the photographer discover that a desired photograph, not in the photo-layout, would best represent the advertising campaign, then the photographer could not create that desired photograph in the post-production process. Instead, the photographer would have to recreate the conditions in the original photo-shoot and retake the photograph using the specific focal depth and depth of field that is associated with the desired focus condition needed.

Depending on the set-up, the particular realistic scene may or may not be able to be practically recreated. In a landscape scene, the particular condition at the original photoshoot, such as a lightning storm at sunset, may not exist. At other times, a manufactured set-up may be overly expensive and difficult to recreate. In either case, the desired photograph cannot be created without additional expense, time, and energy.

A photoshoot is conducted by a photographer skilled in the art of photography: normally a professional photographer. The professional, through years of experience and learning, can manipulate the imaging device to produce the desired focus effects (e.g., focus depth and depth of field). An amateur photographer, on the other hand, may not be skilled enough in photography to understand how focus conditions will affect the created photograph. Usually, the amateur photographer relies on the imaging device to automatically determine the exposure and select the focus parameters to effect the exposure. The imaging device may or may not produce a photograph having a desired focus condition.

For example, in a landscape photograph, the photographer may desire to have the foreground and the background in sharp focus. This would require an exposure having, among other parameters, an aperture on the lens of the imaging device giving a wider depth of field. However, the imaging device may have automatically set up the exposure with an aperture giving a shallow depth of field. As a result, the produced photograph will not give the desired wider depth of field.

Thus, a need exists for a process where pre-production decisions in creating photographs do not necessarily control and limit post-production photographs. Another need exists for a photographic process that compensates for the lack of knowledge in the area of focus effects exhibited by an amateur photographer.

SUMMARY OF THE INVENTION

The present invention provides a method for varying focus in photographs of a scene. One embodiment of the present invention provides a method that achieves the above accomplishment and which also provides for control over focus parameters at any point in the production process. Additionally, one embodiment of the present invention provides a method that achieves the above accomplishments and which also provides for a photographic process that compensates for the lack of skill by an amateur photographer in selecting focus parameters.

Specifically, one embodiment of the present invention discloses a method for modeling a scene using a parametric texture map (PTM) under varying focus conditions of one or more dimensions: e.g., focus depth and depth of field. A dataset of photographs is obtained under separate focus conditions. Performing an approximation of the dataset allows for the capability to generate a spectrum of photographs of the scene. The spectrum of photographs represent varying focus conditions anywhere within a range of focus conditions specified by the initial dataset of photographs. In addition, extrapolation yields results outside the range of focus conditions.

These and other benefits of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 5B illustrates a two-dimensional representation of the three-dimensional scene of FIG. 2, and a graphical user interface varying in one focus parameter, showing a wide depth of field, in accordance with one embodiment of the present invention.

FIG. 6 illustrates a two-dimensional representation of the three-dimensional scene of FIG. 2, and a graphical user interface varying in two focus parameters, showing a wide depth of field and with the foreground in maximum focus, in accordance with one embodiment of the present invention.

DETAILED DESCRIPTION OF THE INVENTION

Figure 1:
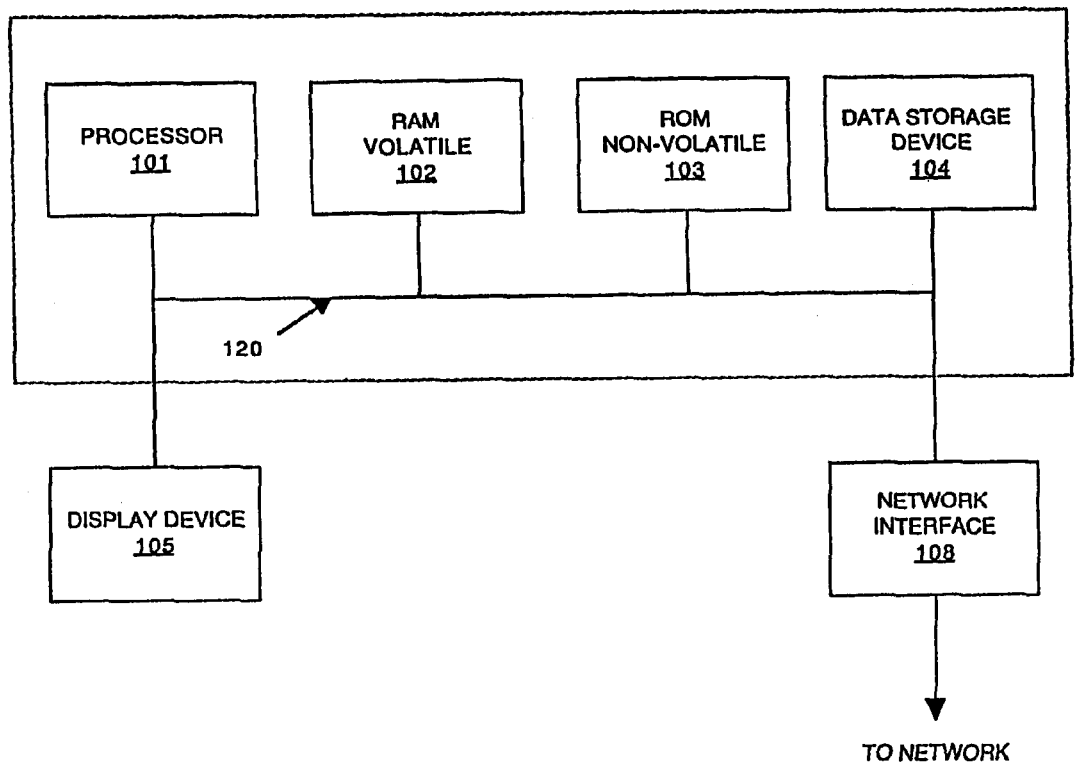
FIG. 1 illustrates a block diagram of an exemplary electronic device that is capable of taking photographs of a scene, in accordance with one embodiment of the present invention.

Reference will now be made in detail to the preferred embodiments of the present invention, a method for varying focus in a plurality of photographs of a scene, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "processing," or "computing," or "translating," or "calculating," or "determining," or "scrolling," or "displaying," or "recognizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, portions of the present invention are comprised of computer-readable and computer-executable instructions which reside, for example, in computer-readable media of an electronic system, such as a electronic imaging device or a digital camera. FIG. 1 is a block diagram of exemplary interior components of an exemplary electronic system 100, upon which embodiments of the present invention may be implemented.

FIG. 1 illustrates circuitry of an exemplary electronic system 100. Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes a data storage device 104 (e.g., memory card, hard drive, etc.) coupled with the bus 120 for storing information and instructions. Data storage device 104 can be removable. Exemplary electronic system 100 also contains an electronic display device 105 coupled to the bus 120 for displaying information, such as a photograph, to a user. The display device 105 utilized with the electronic system 100 may be a liquid crystal device, cathode ray tube (CRT), field emission device (FED, also called flat panel CRT) or other display device suitable for creating photographic or graphical images.

With reference still to FIG. 1, an optional signal Input/Output device 108 which is coupled to bus 120 for providing a communication link between electronic system 100 and a network environment is described. As such signal Input/Output device 108 enables the central processor unit 101 to communicate with or monitor other electronic systems or analog circuit blocks coupled to a communication network.

Focus control in photographs of a scene

For purposes of the present Application, a method for varying focus in a plurality of photographs of a scene, will be described in the context of parametric texture maps. A description of parametric texture maps is described in U.S. Ser. No. 09/329,553, DIRECTION-DEPENDENT TEXTURE MAPS IN A GRAPHICS SYSTEM, filed Jun. 10, 1999 to Malzbender; and U.S. Ser. No. 09/528700, APPARATUS FOR AND METHOD OF RENDERING 3D OBJECTS WITH PARAMETRIC TEXTURE MAPS, filed Mar. 17, 2000 to Malzbender, that are herein incorporated by reference as background material.

Accordingly, the present invention provides a method for varying focus in a plurality of photographs of a scene. Also, one embodiment of the present invention provides a method that achieves the above accomplishment and which also provides for control over focus parameters at any point in the production process. Additionally, another embodiment of the present invention provides a method that achieves the above accomplishments and which also provides for a photographic process that compensates for the lack of skill by an amateur photographer in selecting focus parameters.

The present invention utilizes parametric texture maps (PTMs) to model a three-dimensional scene, object, or group of objects, in a two-dimensional photograph under varying focus conditions, in accordance with one embodiment of the present invention. For purposes of this Application, the term "scene" is to also to refer to objects, or a group of objects. These PTMs represent more than just a single color value per pixel or subpixel as most photographs or texture maps do. The PTMs are able to dynamically and selectively reconstruct subpixel color values under varying focus conditions.

Figure 7:
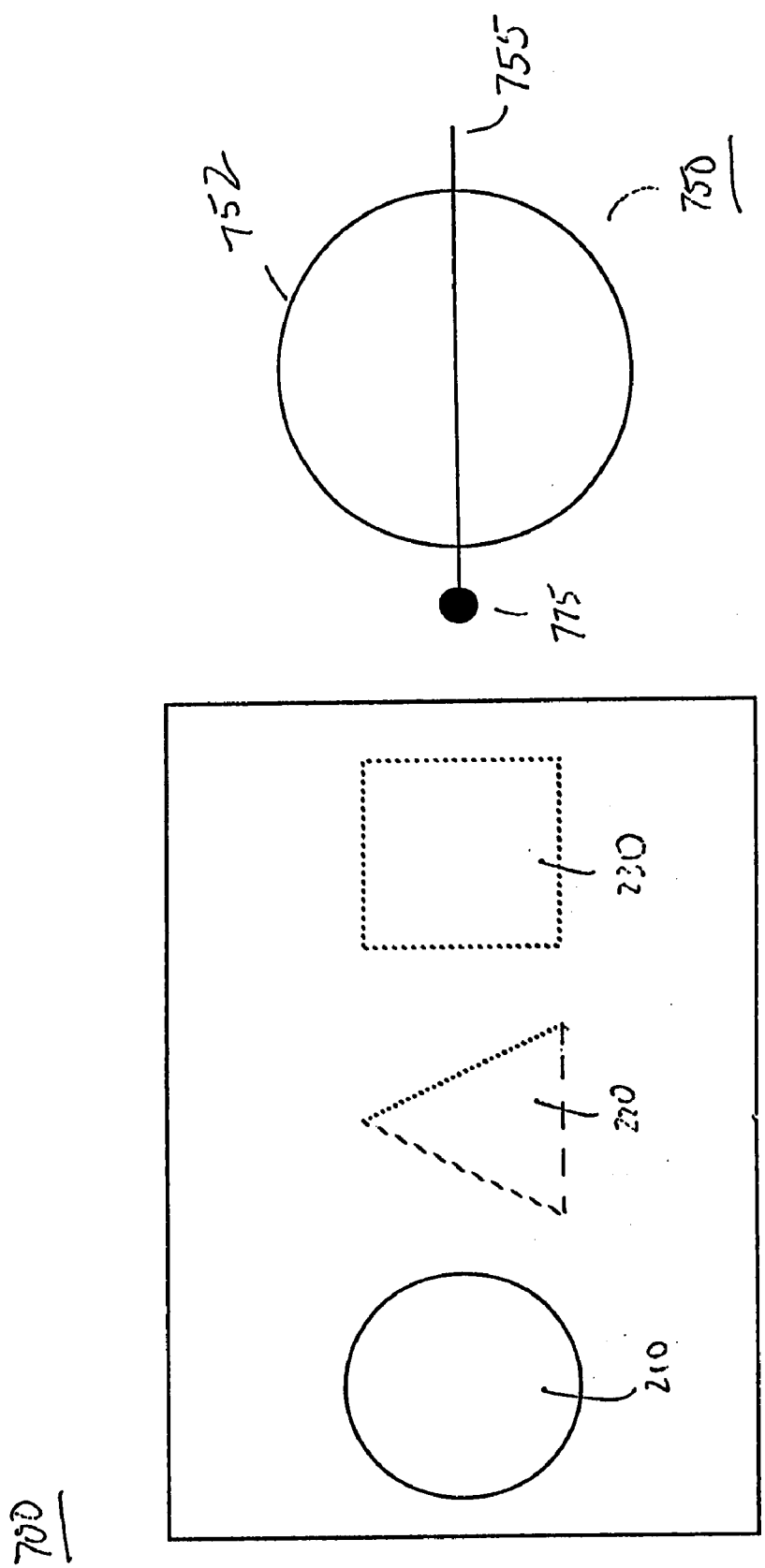
FIG. 7 illustrates a two-dimensional representation of the three-dimensional scene of FIG. 2, and a graphical user interface varying in one focus parameter, bringing in objects into focus through extrapolation under focus conditions outside of the initial range of focus conditions, in accordance with one embodiment of the present invention.
Figure 8:
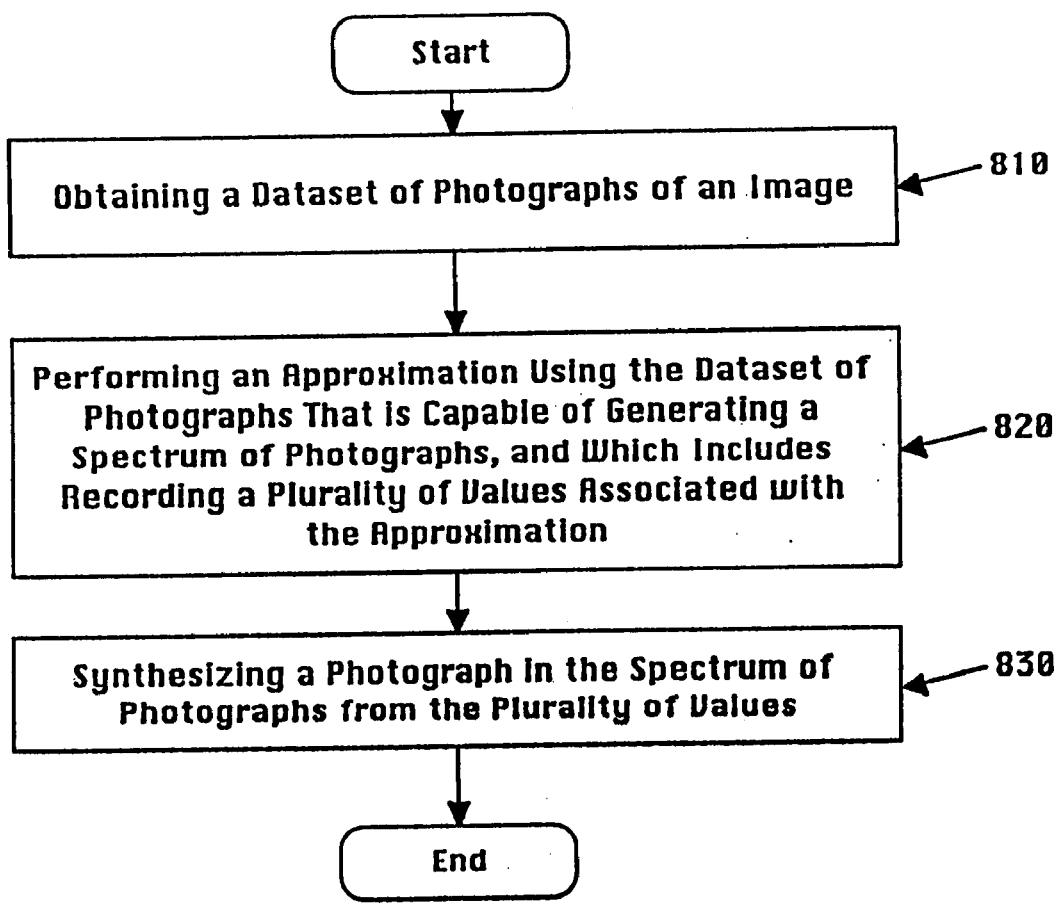
FIG. 8 is a flow diagram illustrating steps in a method for varying focus in a scene, in accordance with one embodiment of the present invention.

The flow chart 800 of FIG. 8, in combination with FIGS. 2, 3, 4A, 4B, 5A, 5B, 6, and 7, illustrate a method for varying focus in a scene in the present invention. Referring now to FIG. 8, the flow chart 800 illustrates a method for varying focus in a two-dimensional representation of a three-dimensional scene, in accordance with one embodiment of the present invention.

Although the term "photograph" is used throughout this disclosure, the term, photograph, is not limited to conventional film based photographs, or to digital based photographs, but is directed towards all means of capturing images.

Figure 2:
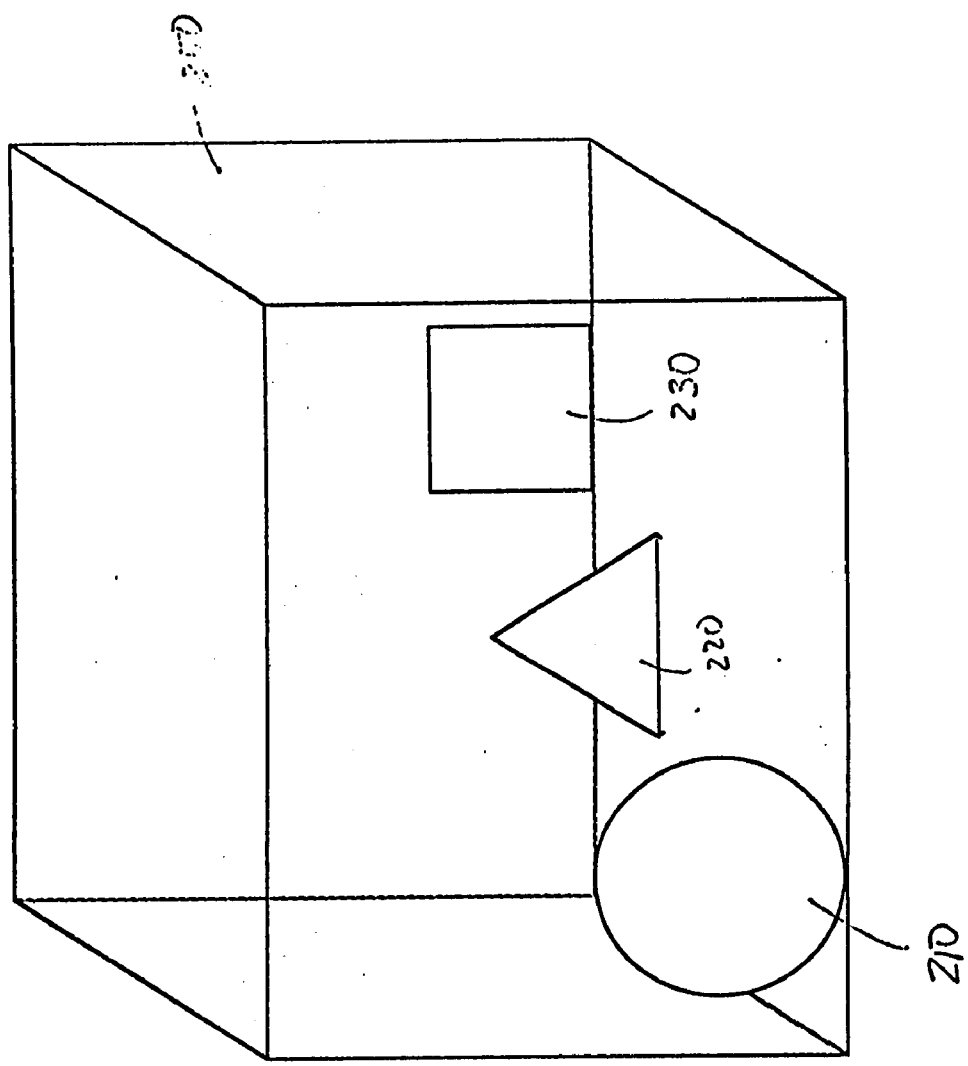
FIG. 2 illustrates a three-dimensional diagram of a scene having a foreground, a middle area, and a background, in accordance with one embodiment of the present invention.

The present embodiment obtains a dataset of photographs taken of a three-dimensional scene, in step 810 of FIG. 8. FIG. 2 provides an illustration of an exemplary three-dimensional scene 200 that is photographed. A round object 210 is in the foreground of scene 200. A triangle object 220 is in the middle area of scene 200. A square object 230 is located in the background of the scene 200. It is appreciated that FIG. 2 is exemplary only and that any three-dimensional scene may be represented by the present invention. The box 250 illustrates the three-dimensional orientation of each of the objects 210, 220, and 230 contained within box 250.

In step 810 of flow chart 800, each of the photographs obtained in the dataset of photographs is a two-dimensional representation of the three-dimensional scene. In the present embodiment, each photograph in the dataset is captured from the same viewpoint but under separate focus conditions.

The dataset of photographs are taken under varying focus conditions, and defines a set of focus conditions which includes the dataset of photographs. In one embodiment of the present invention, only one focus parameter is varied. For the purposes of the Application, such a condition is referred to as a focus condition with a "single dimension." In another embodiment of the present invention, two focus parameters are varied. Such an environment is referred to as a focus condition with "two dimensions".

For example, a dataset of photographs can have a focus condition varying in one dimension: focus depth, in accordance with one embodiment of the present invention. The focus depth is specified by setting the focus adjustment to a particular depth on the electronic system 100 used to acquire the dataset of photographs. A lens on the electronic system 100 only allows one focal plane to be in maximum focus. The series of focal planes run parallel with the electronic system 100, or in the conventional case, parallel with the film in the camera. The further away a part of the scene is from the focal plane in maximum focus, the more it is out of focus.

In another example, another dataset of photographs can have a focus condition varying in one dimension: depth of field, in accordance with one embodiment of the present invention. As mentioned previously, although only one focal plane is in maximum focus in a photograph, a zone of sparseness surrounding the focal plane is also relatively in focus. This zone of sharpness is depth of field. In one embodiment, depth of field increases when the aperture on the electronic system 100 is reduced. Other embodiments of this invention are well suited to varying depth of field through other well known methods (e.g., varying the focal length of the lens).

For focus conditions that vary in only one dimension, three photographs are needed to comprise a dataset of photographs, in accordance with one embodiment of the present invention. A dataset of photographs comprising more than three photographs may provide a better PTM representation in generating photographs over the range of focus conditions in a given dataset.

For focus conditions that vary in two dimensions, six photographs are needed to comprise a dataset of photographs, in accordance with one embodiment of the present invention. A dataset of photographs comprising more than six photographs may provide a better PTM representation in generating photographs over the region of focus conditions in a given dataset.

Figure 3:
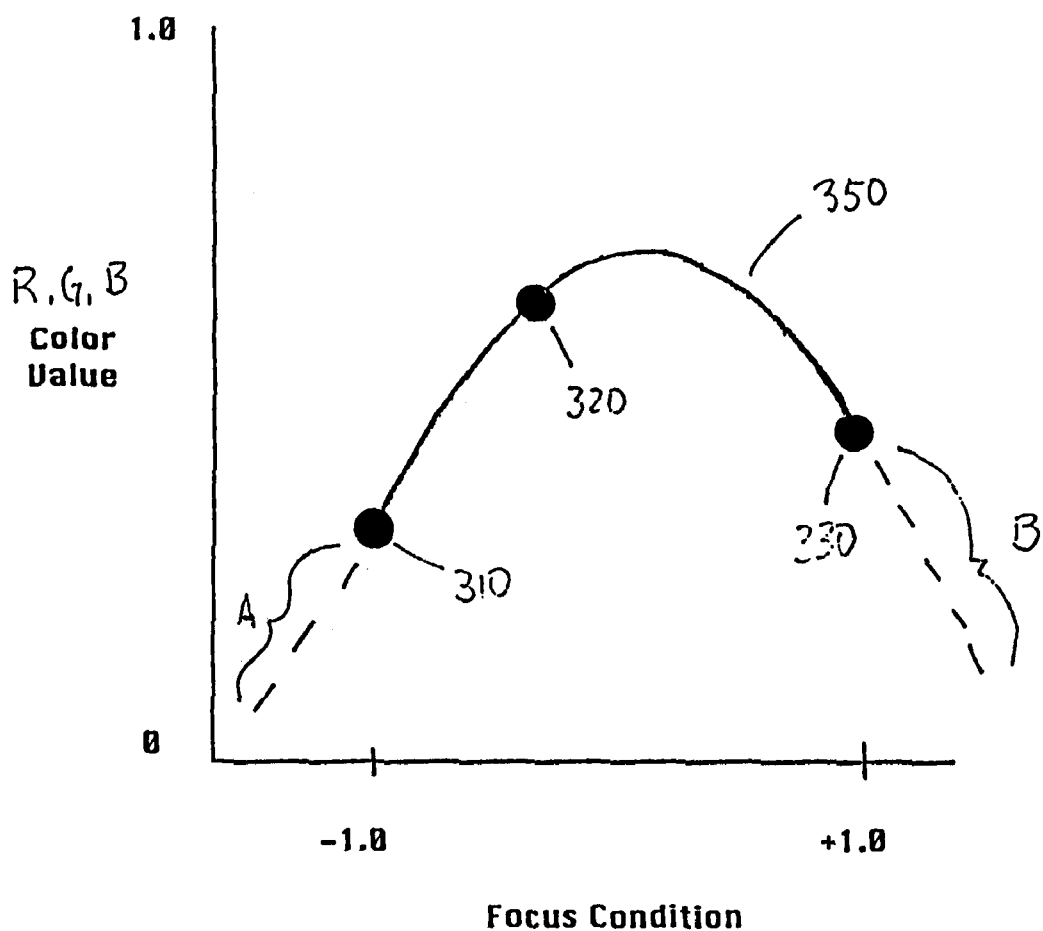
FIG. 3 is a graphical parametric texture mapping representation of color values as a function of focus conditions for a subpixel of a scene, in accordance with one embodiment of the present invention.

The dataset of photographs of a scene is further broken down into a dataset of color values for each subpixel in the dataset of photographs, in accordance with one embodiment of the present invention. FIG. 3 illustrates a graph 300 representing color values for a subpixel as a function of focus condition, in accordance with one embodiment of the present invention.

Those well known in the art understand the electronic system 100 to create a photograph by storing and/or displaying color values per pixel on a display. The display is comprised of a rectilinear grid of thousands of pixels. Each of the pixels produce a color to form a photograph produced on the display, in the present invention. Subpixels are used to control the spectrum of colors available to the pixel and the format to be used in displaying those colors.

The graph 300 in FIG. 3 illustrates that the subpixels have varying color values within each color channel, or subpixel, in accordance with one embodiment of the present invention. On the vertical axis, the color value is represented as a value between zero and one, with zero representing the lightest color value, and one representing the deepest color value. The color values are representative of red, green, and blue color values respectively, in accordance with one embodiment of the present invention. For example, in the red color channel, or red subpixel, a color value of one would give the deepest or fullest red available. A color value of zero would give the lightest red available.

The horizontal axis provides a range of values for focus conditions. Graph 300 represents color values for a corresponding color channel as a function of focus conditions varying in one dimension (e.g., focus depth, or depth of field).

Graph 300 of FIG. 3 shows a dataset of color values for one particular subpixel with three data points: point 310, point 320, and point 330. These three points correspond to three photographs that comprise a corresponding dataset of photographs of a scene. The three photographs were taken under three separate focus conditions. The graph 300 represents the color values for a particular subpixel, and color channel, of a particular pixel in each of the three photographs in the dataset.

Referring back to flow chart 800 of FIG. 8, the present invention performs an approximation of the dataset of photographs, in step 820, that is capable of generating a spectrum of photographs, in accordance with one embodiment of the present invention. The spectrum of photographs are representations or approximations of actual photographs that would have been taken under the actual focus condition, within the set of focus conditions as defined by the dataset of photographs. The representations are determined through parametric texture mapping.

In a dataset where the focus conditions vary in a single dimension, if a dataset contains only three photographs, then by definition, the approximation could also be an interpolation of the dataset of color values for a particular subpixel. In a dataset where the focus conditions vary in two dimension, if a dataset contains only six photographs, then by definition, the approximation could also be an interpolation of the dataset of color values for a particular subpixel.

FIG. 3 provides an approximation of the dataset of color values for a particular subpixel. The dataset of color values is a subset of color values from a corresponding dataset of photographs taken under focus conditions varying in a single dimension. The approximation of the dataset of color values is presented by curve 350 in FIG. 3.

Points 310 and 330 are end points of a range of focus conditions that is defined by the dataset of photographs, and correspondingly the dataset of color values. The focus conditions are assigned values between −1.0 and +1.0 through the range of focus conditions. At one end of the range of focus conditions, a minimum focus condition, the color value at point 310 corresponds to a focus condition of −1.0. At the far end of the range of focus conditions, a maximum focus condition, the color value at point 330 corresponds to a focus condition of +1.0.

The curve 350 between point 310 and point 330 provides an approximation of the dataset of color values that is capable of generating a spectrum of color values over the full range of focus conditions. Combining color values for all the subpixels of a scene, a spectrum of photographs can be generated within the range of focus conditions. The spectrum of photographs is an approximation of actual photographs that would have been taken for each focus condition within the range of focus conditions.

Continuing with step 820 of flow chart 800, a plurality of values associated with the approximation of the dataset of photographs is recorded, by one embodiment of the present invention. The plurality of values are determined in order to provide for the approximation of the color values over the full range of focus conditions. As such, the plurality of values are utilized to generate each of the spectrum of photographs through the range of focus conditions as defined by the dataset of photographs.

In step 830 of flow chart 800, the present embodiment synthesizes photographs from the plurality of values to generate the previously mentioned spectrum of photographs within the range of focus conditions.

Although embodiments of the present invention discuss PTM representations with a quadratic polynomial function, other embodiments are well suited to PTM representations with other suitable functions or equations.

As previously discussed, the present invention utilizes parametric texture maps (PTMs) to model photographs of a scene under varying focus conditions. In one embodiment, instead of storing color values for each subpixel to produce only one photograph of a scene, coefficients of a quadratic polynomial function of one or more variables are stored. The quadratic polynomial function provides color values for a subpixel as a function of focus condition. The quadratic polynomial function is the PTM modeling of photographs for a scene under varying focus conditions.

Instead of storing the color values for each subpixel for every possible focus condition, the quadratic polynomial can be evaluated for each subpixel under varying focus conditions. As such, when the particular focus condition is specified, a resulting color value for the subpixel can be interpolated from the polynomial equation. The technique of representing each color channel with a red, green, and blue parametric texture map (RGB PTM) allows for modeling of photorealistic changes in the color of a subpixel due to changes in focus conditions, in accordance with one embodiment of the present invention.

In contrast, without the PTM representation, in order to synthesize a photograph for a given focus condition, for each subpixel, a color sample for every possible focus condition would be required. For example, in the case where the focus condition varies in a single dimension, the color values for a scene can be represented by storing just three coefficients to the univariate quadratic polynomial as a RGB PTM representation. In this manner a spectrum of photographs spanning a defined set of focus conditions can be recreated.

On the other hand, in order to recreate every possible photograph in the spectrum of photographs mentioned in the previous paragraph, first, every possible photograph spanning the defined set of focus conditions would have to be taken. The spectrum of photographs would include taking numerous photographs, each with a slight delta deviation in the focus condition from the previous photograph. Thereafter, a color value for each subpixel would have to be stored for each photograph spanning the spectrum of photographs. Many more than the three coefficients that are stored in the PTM modeling are needed to recreate the spectrum of photographs. In this case, valuable memory resources would be utilized in an inefficient manner to store the numerous values of color for each subpixel.

The variation in subpixel color through the range of focus conditions, as defined by the dataset of photographs, is represented with a second order biquadratic polynomial in Eq. 1, in accordance with one embodiment of the present invention. The color values in Eq. 1 vary in two dimensions (e.g., focus depth (F) and depth of field (D)).

$$\text{Color Value } (F,D) = a_0 F^2 + a_1 D^2 + a_2 FD + a_3 F + a_4 D + a_5 \qquad (1)$$

Per subpixel, the coefficients $a_0$, $a_1$, $a_2$, $a_3$, $a_4$, and $a_5$ are stored. In one embodiment, the coefficients are stored in a table per subpixel, such as, Table 900 of FIG. 9B. Table 900 illustrates the coefficients for Eq. 1 for a pixel, such as the exemplary pixel 910 of FIG. 9A. The pixel 910 has three subpixels that in combination form the entire spectrum of colors available to be displayed in pixel 910. In one embodiment of the present invention, pixel 910 is comprised of three subpixels: red subpixel 920, green subpixel 930, and blue subpixel 940.

Figures 9A, 9B:
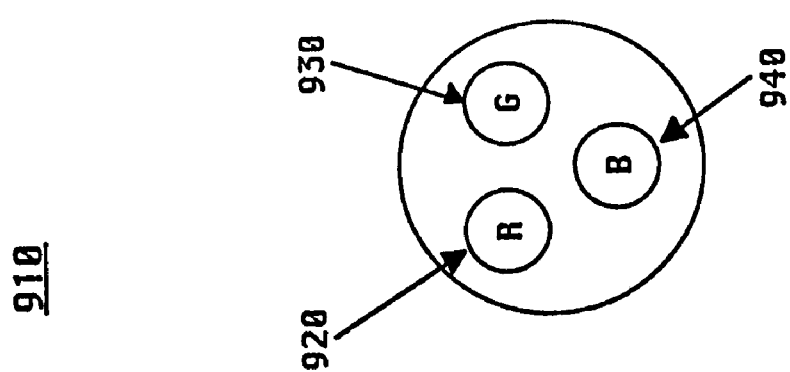
FIG. 9A is a block diagram of an exemplary pixel, in accordance with one embodiment of the present invention.
FIG. 9B illustrates a table showing the values for coefficients of a biquadratic polynomial function for the pixel in FIG. 9A, in accordance with one embodiment of the present invention.

Table 900 of FIG. 9B illustrates entries of coefficients for Eq. 1 for the subpixels of a pixel 910. In column 950, the various coefficients ($a_0$ through $a_5$) of the biquadratic polynomial function that represent the color values of red across the defined set of focus conditions are stored. In column 960, the various coefficients ($a_0$ through $a_5$) of the biquadratic polynomial function that represent the color values of green across the defined set of focus conditions are stored. In column 970, the various coefficients ($a_0$ through $a_5$) of the biquadratic polynomial function that represent the color values of blue across the defined set of focus conditions are stored.

The quadratic polynomial function is used to reconstruct the subpixel color under varying focus conditions. In the case of one focus parameter, the polynomial in Eq. 1 reduces to a polynomial function with one variable (a univariate polynomial) and can be used to represent the color value of a subpixel under varying focus conditions. In the case of two focus parameters, the polynomial in Eq. 1 remains a polynomial function with two variables (biquadratic) and can be used to represent the color values under the varying focus conditions.

A least mean squares curve fitting technique known to those in the art is used to fit the polynomial function of Eq. 1 to the dataset of color values for a particular subpixel over the set of focus conditions, in one embodiment of the present invention. For example, a least mean squares curve fitting technique can be used to determine the coefficients of a corresponding univariate quadratic polynomial function that best fit the data points 310, 320, and 330 of FIG. 3. The approximation of the dataset of color values, as illustrated in curve 350, is a plot of the fitted univariate quadratic polynomial function. Embodiments of the present invention are also well suited to other curve fitting techniques in fitting the polynomial in Eq. 1 to the dataset of color values.

The free parameters, F and D, in Eq. 1 can be used to interpolate between a number of related photographs of a scene, in accordance with one embodiment of the present invention. The present invention relates to using RGB PTMs to represent photographs that vary in focus depth, and optionally depth of field. The resultant RGB PTM offers the capability to generate or synthesize photographs with continuously varying focus conditions within the set of focus conditions.

Figure 4A:
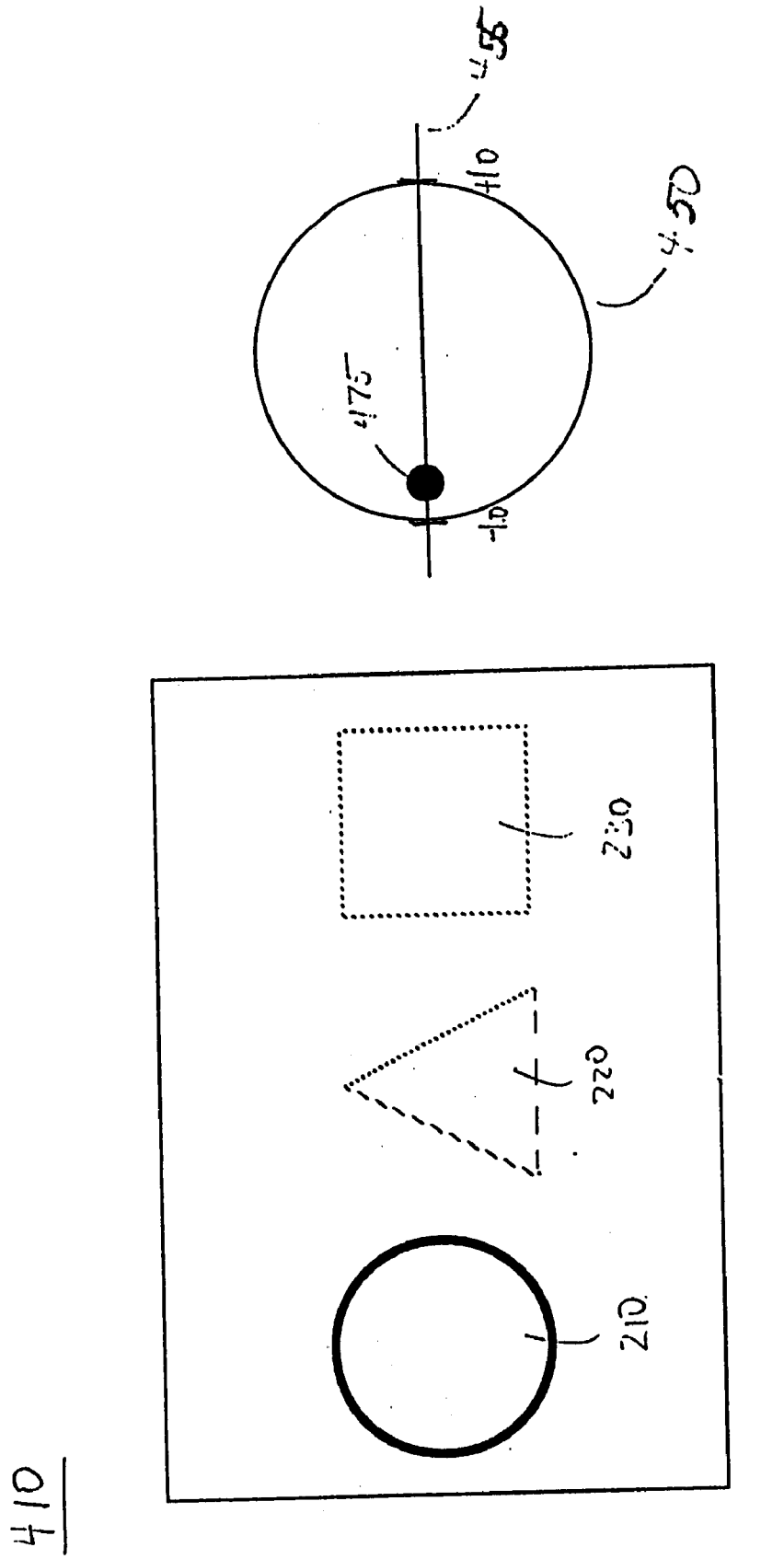
FIG. 4A illustrates a two-dimensional representation of the three-dimensional scene of FIG. 2, and a graphical user interface varying in one focus parameter, showing the foreground in maximum focus, in accordance with one embodiment of the present invention.

Referring now to FIG. 4A, the photograph 410 represents a two-dimensional representation of the three-dimensional scene 200 of FIG. 2. FIG. 4A demonstrates a color representation with a RGB PTM where only one focus element is varying: focus depth, in accordance with one embodiment of the present invention. A dataset of photographs are taken, each with a progressively more distant focus depth. For the one-dimensional case, where only one focus element is varying, only three photographs are needed in the dataset of photographs.

The quadratic polynomial in Eq. 1 is fit to the dataset of color values associated with a particular subpixel. The dataset of color values as represented in FIG. 3 could be an exemplary dataset for the particular subpixel. A resultant RGB PTM now offers color values with a varying focus depth. Note, in this case only one of the two available free variables, F, is used, thus resulting in a univariate quadratic PTM to be fitted, as follows:

$$\text{Color Value } (F) = a_0 F^2 + a_3 F + a_5 \qquad (2)$$

The depth of field variable (D) goes to zero in the above embodiment. For creativity purposes, the depth of field may be constant or of some variation, in accordance with one embodiment of the present invention. However, in either case, the depth of field variable (D) remains uncontrolled in the RGB PTM and drops out of Eq. 1 to form Eq. 2.

The dataset of color values is taken between an assigned range spanning $-1.0 < F < +1.0$, where the variable F represents the varying focus condition, focus depth, in Eq. 1. As discussed previously, FIG. 3 could be an exemplary dataset of color values. Further, the dataset of color values as shown in FIG. 3 could represent photographs taken at focus depths of maximum focus that include the foreground with circle object 210, the middle ground with triangle object 220, and the background with square object 230.

By combining the color values for all the subpixels in the dataset of photographs of the scene 200 as shown in FIG. 2, a photograph with a selected focus condition is produced or synthesized, such as photograph 410 in FIG. 4A. The synthesizing of photographs is described in step 830 of flow chart 800. Photograph 410 shows the circle object 210 in the foreground is in maximum focus. Circle object 210 is represented by a bold solid line. Since, only one focal plane is in maximum focus, the rest of the objects not in that focal plane would be out of focus. As such, the objects 220 and 230, drawn in dotted lines, are shown out of focus in photograph 410.

An exemplary graphical user interface (GUI) 450 shows one implementation where the focal plane of maximum focus can be selected. In GUI 450, axis 455 represents the focus depth between a range of −1.0 (minimum focus depth) and +1.0 (maximum focus depth). As such, the left side of axis 455 represents the foreground, and the right side of axis 455 represents the background. GUI 450 is exemplary only, and other embodiments can implement other forms of graphical user interfaces, such as, a sliding bar, a roller ball, etc.

In FIG. 4A, point 475 resides on the left side of axis 455, and indicates that the foreground is selected to be in maximum focus. As such, circle object 210 would be in maximum focus in the photograph 410.

Figure 4B:
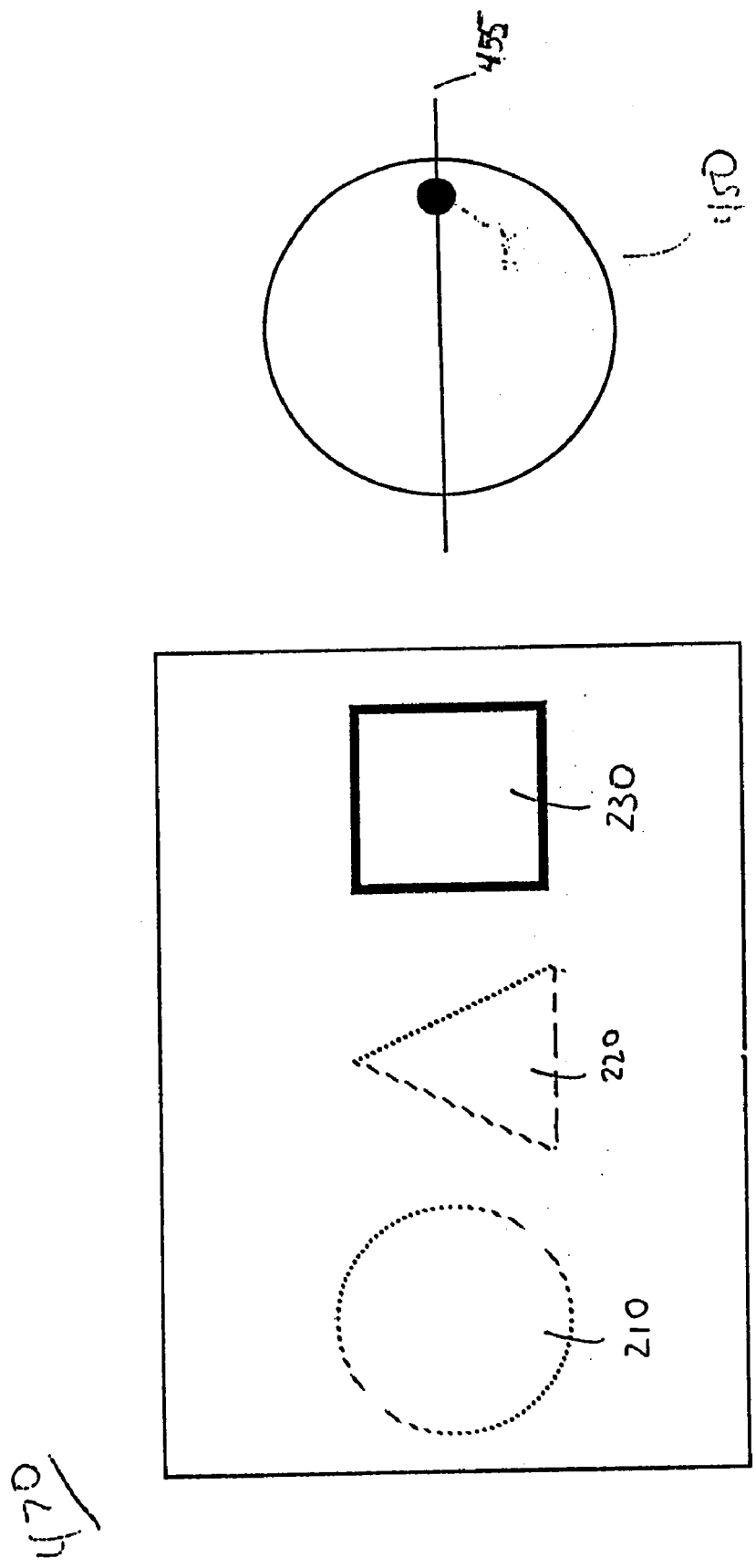
FIG. 4B illustrates a two-dimensional representation of the three-dimensional scene of FIG. 2, and a graphical user interface varying in one focus parameter, showing the background in maximum focus, in accordance with one embodiment of the present invention.

Referring now to FIG. 4B, the photograph 420 represents a two-dimensional representation of the three-dimensional scene 200 of FIG. 2, showing the background in maximum focus, in accordance with one embodiment of the present invention. The dataset of color values as shown in exemplary FIG. 3, is able to generate the two-dimensional representation in photograph 420.

Photograph 420 shows the square object 230 in the background is in maximum focus. Square object 230 is represented by a bold solid line. Since, only one focal plane is in maximum focus, the rest of the objects not in that focal plane would be out of focus. As such, the objects 210 and 220, drawn in dotted lines, are shown out of focus in photograph 420.

In FIG. 4B, point 475 resides on the right side of axis 455, and indicates that the background is selected to be in maximum focus. As such, square object 230 would be in maximum focus in the photograph 410.

It is important to note, the photographs 410 and 420 may not be the exact photographs that comprise the original dataset of photographs that produced the dataset of color values in FIG. 3. Photographs 410 and 420, instead are interpolated photographs that are created through the RGB PTM representation.

Figure 5A:
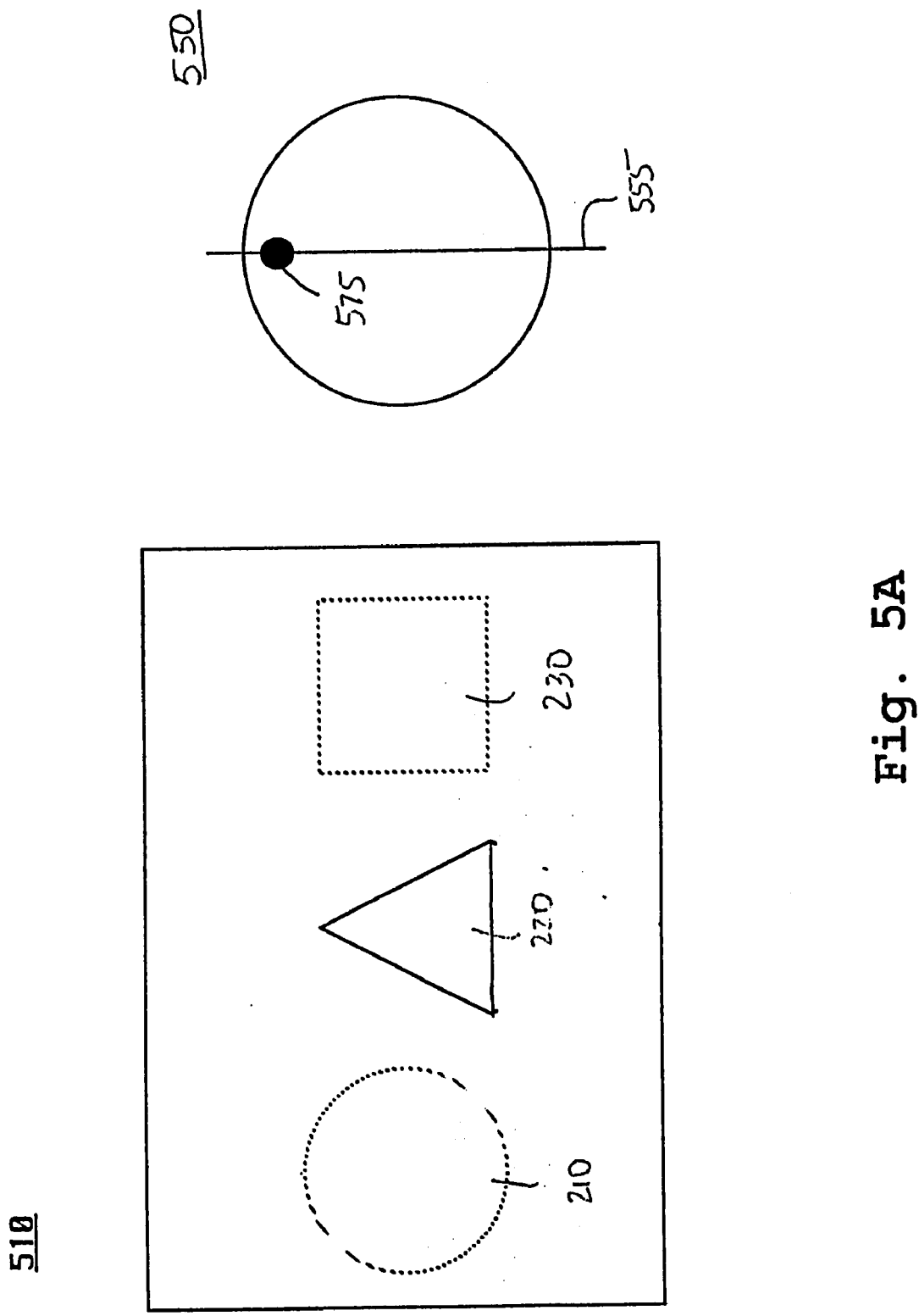
FIG. 5A illustrates a two-dimensional representation of the three-dimensional scene of FIG. 2, and a graphical user interface varying in one focus parameter, showing a narrow depth of field, in accordance with one embodiment of the present invention.

Referring now to FIG. 5A, the photograph 510 represents a two-dimensional representation of the three-dimensional scene 200 of FIG. 2. FIG. 5A demonstrates a color representation with a RGB PTM where another focus element is varying: depth of field, in accordance with one embodiment of the present invention. A dataset of photographs are taken, each with a progressively wider depth of field. For the one-dimensional case, where only one focus element is varying, only three photographs are needed in the dataset of photographs.

The quadratic polynomial in Eq. 1 is fit to the dataset of color values associated with a particular subpixel in the dataset of photographs. The dataset of color values as represented in FIG. 3 could be an exemplary dataset for a particular subpixel. A resultant RGB PTM, for the particular subpixel, now offers color values with a varying depth of field. Note, in this case only one of the two available free variables, D, is used, thus, resulting in a univariate quadratic PTM to be fitted, as follows:

$$\text{Color Value } (D) = a_1 D^2 + a_4 D + a_5 \qquad (3)$$

The focus depth variable (F) goes to zero in the above embodiment. For added creativity, a constant or some variation of focus depth could be used in the photographs taken in the dataset of photographs, in accordance with one embodiment of the present invention. In either case, the focus depth variable (F) remains uncontrolled in the RGB PTM and drops out of Eq. 1 to form Eq. 3.

Varying the opening of a camera lens varies the depth of field. With the camera opened a small amount (high f-stop number), most of the field in the photograph is in focus: a wide depth of field. With the camera opened a wide amount (low f-stop number), a small amount of the field is in focus: a shallow depth of field. When opened fully, the camera lens only produces a narrow range of depth in the scene that is in focus, given the correct light exposure.

The dataset of color values is taken between an assigned range spanning −1.0<D<+1.0, where the variable D represents the varying focus condition, depth of field, in Eq. 1. FIG. 3 could represent an exemplary dataset of color values. Further, the dataset of color values as shown in FIG. 3 could represent photographs taken at varying depths of field that include the circle object 210 in the foreground, the triangle object 220 in the middle area, and the square object 230 in the background.

By combining the color values for all the subpixels in the dataset of photographs of the scene 200 as shown in FIG. 2, a photograph with a selected focus condition can be produced or synthesized, such as photograph 510 in FIG. 5A. Synthesizing photographs is described in step 830 of flow chart 800. Photograph 510 shows a very narrow depth of field. The narrow depth of field indicates that a narrow zone of sharpness exists around the focal plane that is in maximum sharpness. In FIG. 5A, essentially, the triangle object 220 in the middle area is the only object in focus. Triangle object 220 is represented by a solid line. Since a narrow depth of field is represented, objects outside of the depth of field would be out of focus. As such, the objects 220 and 230, drawn in dotted lines, are shown out of focus in photograph 510.

An exemplary graphical user interface (GUI) 550 shows one implementation where the depths of field can be selected. In GUI 550, vertical axis 555 represents the varying depths of field between a range of −1.0 (narrow depth of field) and +1.0 (wide depth of field). As such, the top of vertical axis 555 represents a narrow depth of field, and the bottom of vertical axis 555 represents an ever expanding, or wider, depth of field. GUI 550 is exemplary only, and other embodiments can implement other forms of graphical user interfaces, such as, a sliding bar, a roller ball, etc.

In FIG. 5A, point 575 resides on the top of vertical axis 555, and indicates that a narrow depth of field is selected. As such, given a dataset of photographs that had a focal plane in the middle area being in maximum focus, and a widening depth of field from that focus condition, the triangle object 220 would be the only object in focus in photograph 510.

In one embodiment, the various photographs in the dataset are taken with a constant focus depth (F), and an expanding depth of field surrounding the constant focal plane at that focus depth. The zones of sharpness, more or less, are comprised of a widening group of focal planes that are located at varying distances away from the focal plane in maximum focus. For example, as stated previously, if the focal plane of maximum sharpness was located in the middle area of FIG. 2, the triangle object 220 would be in the focal plane of maximum focus. Widening the depth of field would brings in focus the focal planes surrounding the triangle object 220.

Referring now to FIG. 5B, the dataset of FIG. 3 can create a photograph 520 having with a wide depth of field, as discussed above. Assuming that the focal plane of maximum focus remains in the middle area, by widening the depth of field, objects in the foreground and the background would gradually come into focus. Photograph 520 shows all the objects in the scene 200 of FIG. 2 in reasonable focus: circle object 210 in the foreground, triangle object 200 in the middle area, and square object 230.

In FIG. 5B, point 575 resides on the bottom of vertical axis 555, and indicates that a wide depth of field is selected. As such, given a dataset of photographs that had a focal plane in the middle area being in maximum focus, and a widening depth of field from that focus condition, all the objects in the scene 200 of FIG. 2 would be in focus.

It is important to note, the photographs 510 and 520 may not be the exact photographs that comprise the original dataset of photographs that produced the dataset of color values in FIG. 3. Photographs 510 and 520, instead are interpolated photographs that are created through the RGB PTM representation.

Referring now to FIG. 6, the photograph 600 represents a two-dimensional representation of the three-dimensional scene 200 of FIG. 2. FIG. 6 demonstrates a color representation with a RGB PTM where two focus parameters are varying: focus depth and depth of field, in accordance with one embodiment of the present invention. This allows control over the specific depth in the scene that is maximally focused, as well as control over the spatial extent that is reasonably in focus.

A dataset of photographs are taken, each with a separate focus condition comprising both the focus depth and depth of field. For the two-dimensional case, where two focus parameters are varying, only six photographs are needed in the dataset of photographs.

The biquadratic polynomial in Eq. 1 is fit to the dataset of color values associated with a particular subpixel. The dataset of color values if graphed would be represented in a three-dimensional graph (not shown). A resultant RGB PTM offers color values with a varying focus condition that varies both in focus depth and depth of field.

The dataset of color values is taken between an assigned range spanning $-1.0 < F < +1.0$, where the variable F represents the varying first dimension, focus depth, in Eq. 1. Also, in the second dimension, the dataset of color values is taken between an assigned range spanning $-1.0, D < +1.0$, where the variable D represents the varying depth of field.

The dataset of color values could represent photographs taken under focus conditions having focus depths of maximum focus that include the foreground with circle object 210, the middle ground with triangle object 220, and the background with square object 230. Also, the dataset of color values could represent photographs taken under focus conditions having varying depths of field that include the circle object 210 in the foreground, the triangle object 220 in the middle area, and the square object 230 in the background.

By combining the color values for all the subpixels in the dataset of photographs of the scene 200 as shown in FIG. 2, a resulting photograph of the scene is produced or synthesized for a selected focus condition, such as photograph 600 in FIG. 6. Synthesizing photographs through the spectrum of photographs is described in step 830 of flow chart 800. Photograph 600 shows the circle object 210 in the foreground is in maximum focus. Circle object 210 is represented by a bold solid line. Photograph 600 also exhibits a wide depth of field where all the objects in the scene 200 of FIG. 2 are reasonably in focus.

Referring back to FIG. 6, for a given initial dataset containing photographs of various focus conditions, a focal plane in the foreground is selected for maximum focus. The focal plane includes circle object 210. In addition, a wide depth of field is shown that also includes objects 220 and 230 that are in focus.

An exemplary graphical user interface (GUI) 650 shows one implementation where the focus conditions of two-dimensions can be selected, in accordance with one embodiment of the present invention. In GUI 650, vertical axis 657 represents the varying depths of field between a range of −1.0 (narrow depth of field) and +1.0 (wide depth of field). As such, the top of vertical axis 657 represents a narrow depth of field, and the bottom of vertical axis 657 represents an ever expanding, or wider, depth of field.

In GUI 650, horizontal axis 655 represents the focus depth between a range of −1.0 (minimum focus depth) and +1.0 (maximum focus depth). As such, the left side of axis 655 represents the foreground in maximum focus, and the right side of axis 655 represents the background in maximum focus.

Since the focus conditions vary in two dimensions, GUI 650 is in the form of a square to encompass the entire range of values for both the F and the D dimensions, in accordance with one embodiment of the present invention. GUI 650 is exemplary only, and other embodiments can implement other shapes and forms of graphical user interfaces.

The position of point 675 in GUI 650 indicates that a focus condition exhibiting a focal plane of maximum focus in the foreground with a wide depth of field is selected. Further, sliding point 675 vertically up will decrease the depth of field, possibly making the square object 230 go out of focus. Correspondingly, sliding point 475 to the right will shift the focus depth to the background. In this case, the circle object 210 would still possibly remain in maximum focus as there is a wide depth of field.

The previous discussion related to the production of photographs within a region of focus conditions as defined by the dataset of photographs. However, PTM representation of color values for focus conditions somewhat outside the set of focus conditions can also be produced through extrapolation, in accordance with one embodiment of the present invention. Extrapolation of color values can be done by solving for focus conditions outside an initial region that includes the initial dataset of focus conditions and their respective color values.

In one embodiment of the present invention, the biquadratic polynomial function of Eq. 1, through extrapolation, Eq. 1 will provide, under certain circumstances, satisfactory results for focus conditions outside of the initial range of focus conditions. The represented focus conditions can vary in one or two dimensions.

For focus conditions varying in one dimension, extrapolation leads to results outside of the horizontal and vertical axis for values beyond −1.0 and +1.0 (e.g., user interfaces 450 and 550) In two dimensions, extrapolation leads to results for focus conditions that lie outside of the square (e.g., user interface 650) bounding the horizontal and vertical axis to values between −1.0 to +1.0.

FIG. 3 illustrates a dataset of color values for a focus condition varying in one dimension. Regions A and B show color values for focus conditions that extend beyond the range of focus conditions (−1.0 to +1.0) as defined by the dataset of photographs. The color values are calculated from the associated RGB PTM univariate quadratic polynomial function representation as discussed previously.

For example, FIG. 7 illustrates a two-dimensional representation of the three-dimensional scene 200 of FIG. 2. FIG. 7 demonstrates a color representation with a RGB PTM where only one focus element is varying: focus depth, in accordance with one embodiment of the present invention.

A dataset of photographs are taken, each with a progressively more distant focus depth. However, in this particular dataset of photographs associated with photograph 700, the range of focus conditions (focus depth) does not include the circle object 210 or the square object 230. Therefore, in the dataset of photographs, none of the photographs were taken with focal planes in the foreground nor the background in maximum focus. Thus, the dataset of photographs would have both the circle object 210 and the square object 230 out of focus.

However, through extrapolation, photograph 700 illustrates that the RGB PTM representation brings into focus the object in the foreground, the circle object 210. Additionally, in another photograph, through extrapolation the RGB PTM representation could bring into focus the square object 230 in the background.

By combining the color values for all the subpixels in the dataset of photographs of the scene 200 as shown in FIG. 2, a photograph with a selected focus condition is produced, such as photograph 700 in FIG. 7. Photograph 700 shows the circle object 210 in the foreground is now in focus. Circle object 210 is represented by a solid line. Since, only one focal plane is in maximum focus, the rest of the objects not in that focal plane would be out of focus. As such, the objects 220 and 230, drawn in dotted lines, are shown out of focus in photograph 700.

An exemplary graphical user interface (GUI) 750 shows one implementation where the focal plane of maximum focus can be selected. In GUI 450, axis 755 represents the focus depth between a range of −1.0 (minimum focus depth) and +1.0 (maximum focus depth). As such, the left side of axis 455 represents the foreground, and the right side of axis 455 represents the background. In addition, GUI 450 shows focus conditions outside the range of focus conditions as defined by the circle 752. GUI 450 is exemplary only, and other embodiments can implement other forms of graphical user interfaces, such as, a sliding bar, a roller ball, etc.

The position of point 775 in GUI 750 indicates that a selected focus condition exhibiting a focal plane of maximum focus in the foreground is outside the range of focus conditions. Similarly, to bring in object 230 possibly into focus, point 775 would be shifted to the right and lying outside of the circle 752 defining the range of focus conditions.

The RGB PTM representation of color values for a particular subpixel allows for the creation of photographs with varying focus conditions at any point in the production process. After selecting a selected focus conditions, the resulting photograph can be generated. The color value for each of the subpixels used to create the photograph is calculated by solving for the corresponding RGB PTM for the selected focus condition. A color value is then solved for the selected focus condition parameters, and displayed.

In another embodiment of the present invention, the method outlined in flow diagram 800 is automatically conducted by an electronic system, such as electronic system 100. Instead of shooting a single photograph under a particular focus condition and exposure, the electronic system 100 would automatically take multiple photographs to build a dataset of color values under varying focus conditions. By fitting an appropriate quadratic polynomial equation to the dataset of photographs, and correspondingly to the dataset of color values, the coefficients to that equation could be stored per subpixel. Thereafter, a user could select the best photograph under a varying range of focus conditions. For an amateur photographer unknowledgeable in the art of exposure and focus conditions, the use of RGB PTMs as outlined in flow diagram 800 creates an apparatus and system that captures most of the available photographs for a particular situation and is almost foolproof.

The use of RGB PTMs allows a user (e.g., graphics artist) to control the focus parameters of a scene at any point throughout the production process. The final photograph is not restricted to focus conditions set and predetermined at the time of exposure. Through approximation and extrapolation of data, many more photographs across a spectrum of focus conditions can be produced throughout the production process. For example, if an advertising agency uses RGB PTM for representing color values of a scene across a varying range of focus conditions, then focus parameters can be selected when photographs are composited together, instead of when the photographs are originally exposed. This would provide significantly greater creative freedom and control.

Although approximate, this PTM representation is a compact way to represent photographs through the range of focus conditions. Instead of storing all the possible color values for photographs throughout a spectrum of focus conditions, only the coefficients are stored per subpixel.

Furthermore, a look up table could present color values for a given set of parameters providing further compression and compactness of the data. In addition, the PTM representation also allows for fast color reconstruction during rendering of the photograph.

For purposes of this Application, the biquadratic polynomial is a function of two focus elements: focus depth (F) and depth of field (D). However, the present invention is well suited to embodiments where other focus elements are envisioned. In addition, the present invention is well suited to embodiments where other higher order polynomials are used to represent a subpixel color value under varying focus conditions. Further, the present invention is also well suited to embodiments where polynomials with more than two dimensions are used to construct the PTM representation. Other embodiments are well suited to PTM representation using other forms of functions or equations.

In addition, the use of RGB PTMs to map color variation in a quadratic polynomial is not restricted to photographs that vary by focus parameters. For example, the element of time is easily suitable to RGB PTM representation. A dataset of photographs taken over a period of time can be represented through the use of RGB PTMs. Instead of selecting between focus conditions, selection of a particular time produces a two-dimensional photograph approximating and reflecting the environmental conditions at that particular time, including lighting, cloud cover, etc.

While the methods of embodiments illustrated in flow chart 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for varying focus in a plurality of photographs of a scene, is thus described. While the present invention has been described in particular embodiments, it should be appreciated that the present invention should not be construed as limited by such embodiments, but rather construed according to the below claims.

What is claimed is:

1. A method of varying focus in a scene, comprising:
   a) obtaining a dataset of photographs of said scene, each of said dataset of photographs created under separate focus conditions within a range of focus conditions;
   b) performing an approximation using said dataset of photographs that is capable of representing a spectrum of photographs of said scene, each of said spectrum of photographs having focus conditions within said range of focus conditions; and
   c) recording a plurality of values associated with said approximation, said plurality of values capable of generating each of said spectrum of photographs.

2. The method as described in claim 1, further comprising:
   obtaining three photographs for said dataset of photographs.

3. The method as described in claim 1, further comprising:
   obtaining said dataset of photographs, each of said dataset of photographs created under separate focus conditions that vary in focus depth.

4. The method as described in claim 1, further comprising:
   obtaining said dataset of photographs, each of said dataset of photographs created under separate focus conditions that vary in depth of field.

5. The method as described in claim 1, further comprising:
   having said dataset of photographs define said range of focus conditions, said dataset of photographs having a first photograph with a minimum focus condition of −1.0 and a second photograph with a maximum focus condition of +1.0.

6. The method as described in Claim 1, further comprising:
- for each subpixel in said scene, obtaining a dataset of color values from said dataset of photographs;
- for each subpixel in said scene, performing said approximation to determine a corresponding spectrum of color values from said spectrum of photographs by a corresponding quadratic polynomial function;
- for each subpixel in said scene, recording a corresponding plurality of coefficients associated with said corresponding quadratic polynomial function.

7. The method as described in claim 6, further comprising:
- for each subpixel in said scene, least mean squares curve fitting a dataset of color values from said dataset of photographs to determine said corresponding plurality of coefficients.

8. The method as described in claim 6, further comprising for each subpixel in said scene, recording said corresponding plurality of coefficients associated with said quadratic polynomial function, comprising:
- Color Value(F, Focus Condition) $=a_0F^2+a_3F+a_5$.

9. The method as described in claim 1, further comprising:
- extrapolating from said dataset of photographs a plurality of photographs having focus conditions outside said range of focus conditions.

10. The method as described in claim 1, further comprising:
- selecting a selected focus condition within said range of focus conditions;
- synthesizing a selected photograph for said selected focus condition from said plurality of values; and
- displaying said selected photograph.

11. A method of varying focus in a scene, comprising:
- a) obtaining a dataset of photographs of said scene, each of said dataset of photographs created under separate focus conditions within a region of focus conditions varying in two dimensions;
- b) interpolating from said dataset of photographs a spectrum of photographs of said scene, each of said spectrum of photographs having focus conditions within said region of focus conditions;
- c) recording a plurality of values associated with said interpolating for deriving each of said spectrum of photographs.

12. The method as described in claim 11, further comprising:
- obtaining six photographs for said dataset of photographs.

13. The method as described in claim 11 further comprising:
- obtaining said dataset of photographs within said region of focus conditions varying in focus depth and depth of field.

14. The method as described in claim 11, further comprising:
- having said dataset of photographs define said region of focus conditions, a first photograph of said dataset of photographs having a minimum focus depth of −1.0 and a second photograph of said dataset of photographs having a maximum focus depth of +1.0, and a third photograph of said dataset of photographs having a minimum depth of field of −1.0 and a fourth photograph of said dataset of photographs having a maximum depth of field of +1.0.

15. The method as described in claim 1, further comprising:
- for each subpixel, obtaining a dataset of color values from said dataset of photographs;
- for each subpixel, interpolating a corresponding spectrum of color values from said spectrum of photographs by a corresponding biquadratic polynomial function that represents color values;
- for each subpixel, recording a corresponding plurality of coefficients associated with said corresponding biquadratic polynomial function.

16. The method as described in claim 15, further comprising:
- for each subpixel, least mean squares curve fitting a dataset of color values from said dataset of photographs to determine said corresponding plurality of coefficients.

17. The method as described in claim 15, further comprising for each subpixel, recording said corresponding plurality of coefficients associated with said quadratic polynomial function, comprising:
- Color Value (F, Focus Depth; D, Depth of Field)$=a_0F^2+a_1D^2+a_2FD+a_3F+a_4D+a_5$.

18. The method as described in Claim 11, further comprising:
- extrapolating from said dataset of photographs a plurality of photographs having focus conditions outside said region of focus conditions.

19. The method as described in claim 11, further comprising:
- selecting a selected focus condition within said region of focus conditions;
- synthesizing a selected photograph for said selected focus condition from said plurality of values; and
- displaying said selected photograph.

20. A computer-readable medium containing computer-readable instructions for causing a computer to perform focus varying operations, comprising:
- a) obtaining a dataset of photographs of said scene, each of said dataset of photographs created under separate focus conditions within a range of focus conditions;
- b) performing an approximation using said dataset of photographs that is capable of representing a spectrum of photographs of said scene, each of said spectrum of photographs having focus conditions within said range of focus conditions; and
- c) recording a plurality of values associated with said approximation, said plurality of values capable of generating each of said spectrum of photographs.

21. The computer-readable medium as described in claim 20, wherein said method further comprises:
- obtaining three photographs for said dataset of photographs.

22. The computer-readable medium as described in claim 20, wherein said method further comprises:
- obtaining said dataset of photographs, each of said dataset of photographs created under separate focus conditions that vary in focus depth.

23. The computer-readable medium as described in claim 20, wherein said method further comprises:
- obtaining said dataset of photographs, each of said dataset of photographs created under separate focus conditions that vary in depth of field.

24. The computer-readable medium as described in claim 20, wherein said method further comprises:

having said dataset of photographs define said range of focus conditions, said dataset of photographs having a first photograph with a minimum focus condition of −1.0 and a second photograph with a maximum focus condition of +1.0.

25. The computer-readable medium as described in claim 20, wherein said method further comprises:

for each subpixel in said scene, obtaining a dataset of color values from said dataset of photographs;

for each subpixel in said scene, performing said approximation to determine a corresponding spectrum of color values from said spectrum of photographs by a corresponding quadratic polynomial function;

for each subpixel in said scene, recording a corresponding plurality of coefficients associated with said corresponding quadratic polynomial function.

26. The computer-readable medium as described in claim 25, wherein said method further comprises:

for each subpixel in said scene, least mean squares curve fitting a dataset of color values from said dataset of photographs to determine said corresponding plurality of coefficients.

27. The computer-readable medium as described in claim 25, wherein said method further comprises for each subpixel in said scene, recording said corresponding plurality of coefficients associated with said quadratic polynomial function, comprising:

Color Value(F, Focus Condition) $a_0 F^2 + a_3 F + a_5$.

28. The computer readable medium as described in claim 20, wherein said method further comprises:

extrapolating from said dataset of photographs a plurality of photographs having focus conditions outside said range of focus conditions.

29. The computer readable medium as described in claim 20, wherein said method further comprises:

selecting a selected focus condition within said range of focus conditions;

synthesizing a selected photograph for said selected focus condition from said plurality of values; and displaying said selected photograph.

30. A computer-readable medium having focus varying parameters stored thereon, said focus varying parameters comprising:

approximation data derived from a dataset of photographs of a scene created under separate focus conditions, said approximation data capable of generating a spectrum of photographs of said scene.

31. The computer readable medium as described in claim 30, wherein said approximation data is capable of generating a photographs of said scene outside of said spectrum of photographs.

32. The computer readable medium as described in claim 30, wherein said approximation data is comprised of a plurality of coefficients of a quadratic polynomial function for each subpixel in each of said spectrum of photographs, said coefficients form fitting said quadratic polynomial function to said dataset of photographs.

33. The computer readable medium as described in claim 30; wherein said set of focus conditions comprise a range of focus depths.

34. The computer readable medium as described in claim 30, wherein said set of focus conditions comprise a range of depths of field.

35. The computer readable medium as described in claim 30, wherein said set of focus conditions comprise a region of focus conditions varying in two dimensions, including a first dimension varying in focus depth, and a second dimension varying in depth of field.

36. The computer readable medium as described in claim 30, wherein said approximation data is for at least one subpixel of said scene.

37. A computer system comprising:

a processor;

a display coupled to said processor;

a computer readable memory coupled to said processor and containing program instructions that, when executed, implement a method of varying focus in a scene, comprising:
  a) obtaining a dataset of photographs of said scene, each of said dataset of photographs created under separate focus conditions within a range of focus conditions;
  b) performing an approximation using said dataset of photographs that is capable of representing a spectrum of photographs of said scene, each of said spectrum of photographs having focus conditions within said range of focus conditions; and
  c) recording a plurality of values associated with said approximation, said plurality of values capable of generating each of said spectrum of photographs.

38. The computer system as described in claim 37, wherein said method further comprises:

obtaining three photographs for said dataset of photographs.

39. The computer system as described in claim 37, wherein said method further comprises:

obtaining said dataset of photographs, each of said dataset of photographs created under separate focus conditions that vary in focus depth.

40. The computer system as described in claim 37, wherein said method further comprises:

obtaining said dataset of photographs, each of said dataset of photographs created under separate focus conditions that vary in depth of field.

41. The computer system as described in claim 37, wherein said method further comprises:

having said dataset of photographs define said range of focus conditions, said dataset of photographs having a first photograph with a minimum focus condition of −1.0 and a second photograph with a maximum focus condition of +1.0.

42. The computer system as described in claim 37, wherein said method further comprises:

for each subpixel in said scene, obtaining a dataset of color values from said dataset of photographs;

for each subpixel in said scene, performing said approximation to determine a corresponding spectrum of color values from said spectrum of photographs by a corresponding quadratic polynomial function;

for each subpixel in said scene, recording a corresponding plurality of coefficients associated with said corresponding quadratic polynomial function.

43. The computer system as described in claim 42, wherein said method further comprises:

for each subpixel in said scene, least mean squares curve fitting a dataset of color values from said dataset of photographs to determine said corresponding plurality of coefficients.

44. The computer system as described in claim 42, wherein said method further comprises for each subpixel in said scene, recording said corresponding plurality of coefficients associated with said quadratic polynomial function, comprising:

Color Value(F, Focus Condition)=$a_0F^2+a_3F+a_5$.

45. The computer as described in claim 37, wherein said method further comprises:

extrapolating from said dataset of photographs a plurality of photographs having focus conditions outside said range of focus conditions.

46. The computer system as described in claim 37, wherein said method further comprises:

selecting a selected focus condition within said range of focus conditions;

synthesizing a selected photograph for said selected focus condition from said plurality of values; and displaying said selected photograph.

\* \* \* \* \*